United States Patent [19]

Linss et al.

[11] 4,188,179
[45] Feb. 12, 1980

[54] APPARATUS FOR MANUFACTURING A BLOWN SYNTHETIC HOLLOW BODY WITH A CLOSED BOTTOM PORTION

[75] Inventors: Gerhard Linss; Karl Ossberger, both of Weissenburg, Fed. Rep. of Germany

[73] Assignee: Ossberger Turbinenfabrik, Fed. Rep. of Germany

[21] Appl. No.: 898,171

[22] Filed: Apr. 20, 1978

Related U.S. Application Data

[63] Continuation of Ser. No. 752,126, Dec. 20, 1976, abandoned, which is a continuation of Ser. No. 582,939, Jun. 2, 1975, abandoned.

[30] Foreign Application Priority Data

Jun. 1, 1974 [DE] Fed. Rep. of Germany ....... 2426735

[51] Int. Cl.² .............................................. B29C 17/07
[52] U.S. Cl. .................................... 425/531; 264/539; 425/532

[58] Field of Search .................. 264/97-99, 264/539-543; 425/525, 531, 532

[56] References Cited

U.S. PATENT DOCUMENTS

| | | | |
|---|---|---|---|
| 3,329,996 | 7/1967 | Marcus et al. | 425/532 |
| 3,371,376 | 3/1968 | Fischer et al. | 425/532 |
| 3,910,741 | 10/1975 | Mehnert | 425/534 |

*Primary Examiner*—Jan H. Silbaugh
*Attorney, Agent, or Firm*—Holman & Stern

[57] ABSTRACT

An apparatus for manufacturing a blown hollow body having a closed bottom portion from a synthetic material comprising a ring nozzle extruder, a head portion forming section, and a multisectional blow-mold wherein extension pieces of each mold section from a cutting edge that cuts the extrusion and closes the bottom of the hollow body as the mold sections are brought together just prior to blowing.

2 Claims, 2 Drawing Figures

APPARATUS FOR MANUFACTURING A BLOWN SYNTHETIC HOLLOW BODY WITH A CLOSED BOTTOM PORTION

This is a continuation of application Ser. No. 752,126, filed Dec. 20, 1976 which in turn is a continuation of application Ser. No. 582,939, filed June 2, 1975, both of which are now abandoned.

BACKGROUND OF THE INVENTION

The instant invention concerns an apparatus for manufacturing a blown synthetic hollow body with a closed bottom portion such as a liquid container, having a ring nozzle which opposite to a discharge device is arranged to be backwardly and forwardly movable, which, for the purpose of forming a head portion, is provided with a recess into which protrudes a backward and forward displacable inner member when it rests on a ring nozzle, as well as a multi-sectional blow mold, the blow mold sections thereof being laterally back and forth movable and being provided at the bottom portion at the height of the ring nozzle respectively with bottom portions.

In a prior art device of this type (German Patent No. 1,062,002), the bottom portions, when the blow mold sections are pushed together, do not contact each other but enclose a tubular gathering mold piece. The inner piece is a continuation of a blow needle which is guided into the discharge device and moves back and forth with the blow needle but is stationary relative to the recess of the discharge device.

The mandrel is also stationary and serves as sliding track for a stop portion which is backward and forward slidably arranged in order to change the width of the nozzle. In order to manufacture a bottom portion, the blow mold sections are spaced apart from each other by a small amount, namely, far enough so that it is possible to insert a loop or the like into the developing slot, which concentrically pulls together the gathering mold piece at the lower end, so that there develops then a tube with a closed bottom portion. However, this apparatus is not suitable if one intends to produce in the recess a gathering mold mouth piece, at the free end of which is proposed a front wall section which runs transverse to the longitudinal axis. Furthermore, the producing of the bottom portion is extremely costly.

It is also known in the prior art (Kautex Information 1, Special Print from "MASCHINEN MARKT" [Machinery Market] 75th Year, issue 8, 22 66/1969) to work a tubular gathering mold piece on a device without discharge section into the open and to move this form piece into a blow mold, the bottom pieces of which having extensions, which, when the blow mold sections are pushed together, contact each other to thereby form a bottom portion. Since the tube is here worked into the open area, it is often too long. This excess length is separated during the pushing together phase of the blow mold.

The excess length represents an excessively high usage of material.

SUMMARY AND OBJECTS OF THE INVENTION

It is the object of the instant invention to provide for a device of the above-mentioned type in which a mouth piece, which is manufacturable with a front wall, is inserted into the discharge device, whereby the reduced material usage is guaranteed and wherein nevertheless a bottom portion can be produced.

A device of the type mentioned above is disclosed in German Patent No. 1,980,402, in which, however, is not shown a separating device which cuts off material that is not accepted by the blow mold, and which exits from the ring nozzle, namely, an ingot butt. It is also possible to provide a shearing knife in the prior art manner to serve as a separating device (German Patent No. 1,111,810), which glides along the front section of the ring nozzle and separates the ingot butt from the ring nozzle. If the blow mold is not movable in an axial direction, i.e., if it cannot be moved away from the ring nozzle, then there must be such an amount of space between the blow mold and the ring nozzle to permit the knife, when the blow mold is closed, to glide along the front section of the ring nozzle, or the knife can function only when blow mold is open, which requires an enlargement of the ingot butt or an increase of time which is required for the manufacture of a hollow body.

It is further an object of the instant invention to produce a device of the above-mentioned type which will not only permit retention of the butt at the smallest possible size but in which the separation of the butt can also be made while the blow mold is closed.

The instant invention provides that the mandrel device is backwardly and forwardly movable in axial direction.

The instant invention proposes further that the extension pieces in a closed state of the blow mold sections, bear on the ring nozzle and each blow mold section has an extension piece. The extension pieces, while being pushed together over the ring nozzle, push towards each other to form the bottom portion of the workpiece, and the inner portion representing the extension of the backwardly and forwardly glidable mandrel device, can be pulled back into the ring nozzle.

In the inventive apparatus, the mandrel device, together with the inner portion, protrudes, during the extrusion of the workpiece from the ring nozzle into the recess of the discharge device. When the workpiece is produced and when the blow mold sections are pushed together, the mandrel device is pulled back together with the inner piece, so that the blow mold sections can be pushed together until the extension pieces of the mold sections abut the ring nozzle.

In a preferred embodiment, the extension pieces during the pushing together phase of the blow mold sections, function as cutting edges until the moment of contact. The cutting edges cut the excess synthetic material as close to the bottom as possible.

The instant invention proposes further that the mandrel device together with the nozzle mouth piece of the ring nozzle which receives the same, form an annular slot. The blow mold is immovable in axial direction and each bottom part is provided with an extension piece extending inwardly, which has a cutting edge. When the blow mold sections are pushed together, the extension pieces abut a portion of the frontal area of the ring nozzle. It is possible to space the cutting edges from the frontal face of the ring nozzle and thereby define a hollow space bridging or connecting the annular slot. The mandrel device is arranged to be slidable in axial direction to block the annular slot.

The utilization of these measures as a butt-separating device in an apparatus of the above-mentioned type enables the arrangement of the extension pieces with the proposed cutting edges as closely as desired to the ring nozzle while it is still possible to separate the ingot butt from the ring nozzle when the blow mold is closed. The combination of the extension pieces having the cutting edges with the movability of the mandrel device in a conical annular slot produces a reduced ingot butt size, and a reduction of the time required for making a hollow body, since the ingot butt cannot afterwards be separated from the hollow body or from the ring nozzle. By "tight" or "close" herein is understood that no further components of the apparatus are located between ring nozzle and the closed extension pieces.

The frontal section of the mandrel device, which, for the purpose of changing the width of the annular slot, is axially movably arranged, and lies at the closed annular slot. For example, the mandrel device is set in the foremost frontal area of the nozzle mouth piece for a minimum angular slot and is set within the nozzle mouth piece for a maximum. The frontal section of the mandrel device, which mandrel, for the purpose of changing the annular slot width, is backward and forward movable, extends from the nozzle cover when the annular slot is closed, and lies in the frontal area of the nozzle mouthpiece during a maximum annular slot. This structure eliminates special measures on mandrel devices and/or nozzle mouth pieces, so that also at a maximum width of the annular slot, the annular slot is terminating precisely in the frontal area of the ring nozzle, and permits the tight placing of the discharge device for the purpose of forming the container mouth piece. This is possible since portions of the extension pieces and their cutting edges have a sufficient distance from the ring nozzle. A closing of the annular slot with a protruding mandrel device permits a tight closing of the annular slot during extended usage of the apparatus in spite of the wear factor.

It is possible to construct the casing areas of the nozzle mouth piece and mandrel device to run first cylindrically from the frontal section towards the rear portion, and then to be of conical shape. It is especially suitable and advantageous, however, when the area of the nozzle mouth piece which defines the annular slot, as well as the casing area of the mandrel device which defines the annular slot, starting from the frontal section towards the rear end, runs in a conical enlarging manner. This will permit an especially speedy closing of the annular slot, the terminal edge of the nozzle mouth piece lies in the frontal section of the ring nozzle, and the terminal piece of the mandrel device, which extends from the nozzle mouth piece when the annular slot is closed, is retained small in size.

A butt-separating device is in general proposed in connection with the following measures: the bottom portions of the closed blow mold sections rest on the nozzle mouth piece, which reduces the length of the ingot butt. The separation of the tube, which is being extruded from the ring nozzle, from the material located in the ring nozzle, is made precisely in the frontal area of the ring nozzle. The mandrel device which defines the annular slot, receives a backward and forward-movable inner mandrel, the frontal terminal end of which extending forwardly into the recess of the discharge device for the purpose of forming a container mouth piece, and during the closing of the blow mold sections it is pulled backwardly into the ring nozzle. The mandrel device is backwardly and forwardly movably arranged during the extrusion of a tube, from which a container is being blown so as to alter the width of the annular slot and thereby the thickness of the walls of the tube.

BRIEF DESCRIPTION OF THE DRAWINGS

The drawings show a preferred embodiment of the instant invention in schematic representation, wherein.

DETAILED DESCRIPTION OF THE INVENTION

Figure 1:
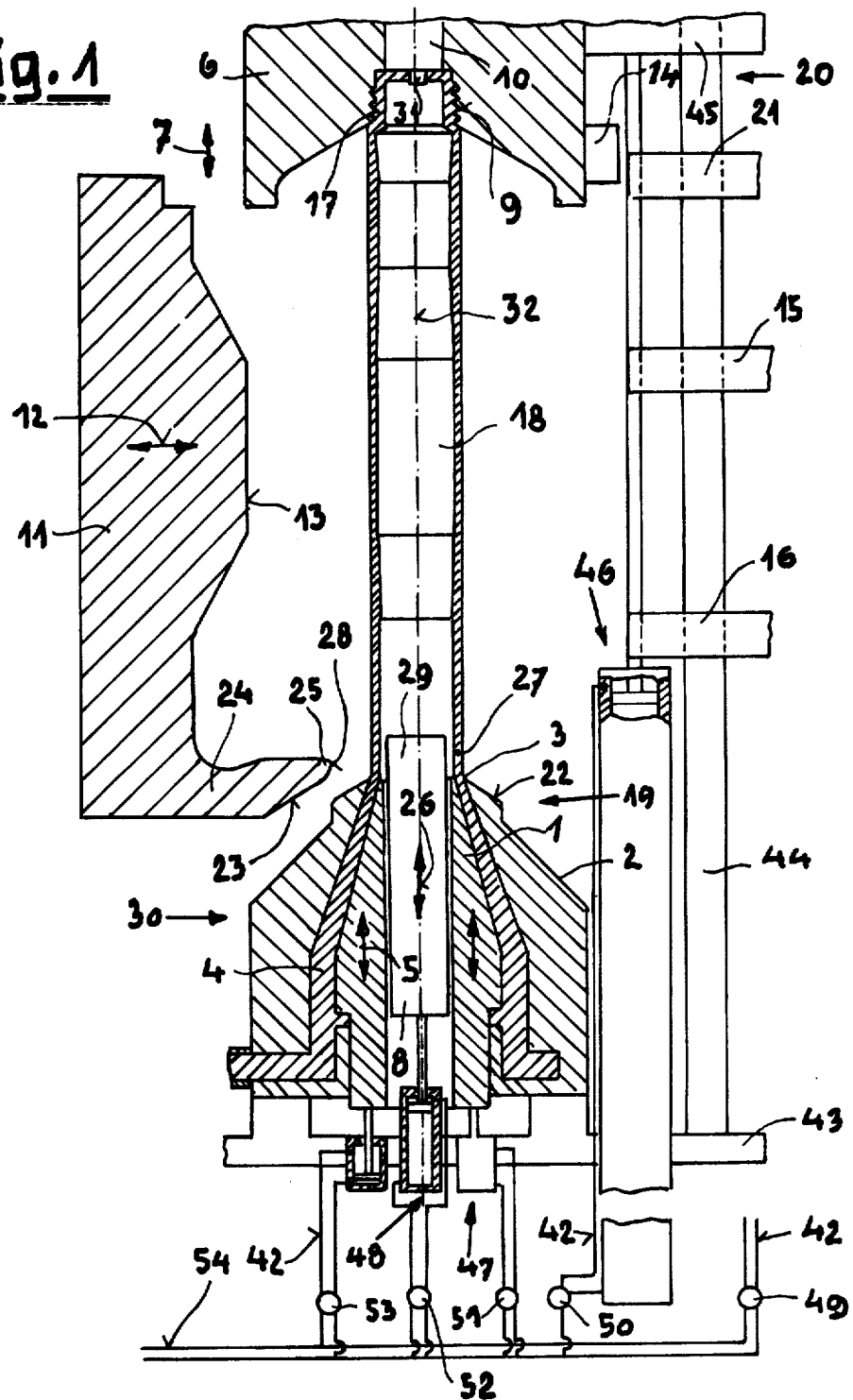
FIG. 1 shows an apparatus for manufacturing a hollow body, comprising a blow mold and a butt-separating device, in a vertical cross-sectional view during an open blow mold.

In an apparatus according to the drawing there is proposed a ring nozzle 30 at the bottom, which ring nozzle is formed by a nozzle cone 1 and a nozzle mouth piece 2 concentrically surrounding said nozzle cone 1. Nozzle cone 1 and nozzle mouth piece 2 form at the top portion an annular slot-type nozzle opening 3, into which a synthetic material 4 is supplied via an annular space between the nozzle cone 1 and nozzle mouth piece 2. While the nozzle mouth piece 2 is in a fixed arrangement, the nozzle cone 1 which is arranged in the inner space, is upwardly and downwardly movable in accordance with arrow 5.

Opposite the ring nozzle 30 there is arranged at the top portion a discharge device 6 which is also termed a head-form and which is upwardly and downwardly movable in accordance with arrow 7. Centrically in the nozzle cone 1 is arranged a mandrel 8, which extends forwardly from the nozzle mouth piece 2 together with an inner portion 29, and extends with its protruding portion into a recess 9 of the discharge device 6 when the same is lowered. Into the recess 9 terminates a blow needle 10 which is centrically arranged in the discharge device 6. The mandrel 8 and the nozzle cone 1 form the mandrel device 34.

There is also indicated a blow mold section 11 of a blow mold, which is closed or opened by moving the blow mold section forward and backward in horizontal direction according to arrow 12. The blow mold is provided with contours 13 at its inside. A trigger cam 14 is mounted laterally on the discharge device 6 which glides past two spaced-apart approximation switches 15, 16 during the upward and downward movement. The approximation switches 15, 16 form a storage device and regulate in a manner, not shown in detail, the return movement of the discharge device 6 and the opening-width of the nozzle opening 3.

The discharge device 6 is at first lowered and rests with the recess 9 on the inner portion 29, whereby into the space between the inner portion 29 and the recess 9 is pressed a neck portion 17, or tubular head, consisting of synthetic material. If the discharge device 6 moves upwardly under additional extrusion of the synthetic material through the nozzle opening 3, there develops then a workpiece 18. The beginning of this workpiece production is present when the discharge device 6 at the bottom rests on the inner portion 29. The end of the initial workpiece production is present when the discharge device takes the position 20 shown in the drawing.

Immediately before the final position 20 there is proposed a further approximation switch 21 in the area of the path of movement of the trigger cam 14, which affects only the non-illustrated activating device of the discharge device 6, when the latter moves into its end-position.

The nozzle mouth piece 2 is provided in its upper area with a inclined surface 22 onto which are placed the two blow mold sections 11 with a commensurate inclined surface 23, when they are closed. This inclined surface 23 is positioned at the lower part of a bottom piece 24 which is provided with an extension piece 25 at its inside. The extensions 25 of the two bottom portions 24 slide, during the closing of the blow mold, into the area of the inner portion 29. The mandrel 8, in accordance with arrow 26, by means of a piston-cylinder device 48, is upwardly and downwardly movable, has first been pulled back. Thus, the extensions 25 push together a lower terminal area 27 of the initial workpiece 18 during the closing of the blow mold, whereby cutting edges 28 of the extensions 25 function.

The inner portion 29 of the mandrel 8 is solid, i.e., it is not hollow, and has a planar frontal surface. The blow needle 10 is substantially closed at its lower end by means of a frontal wall and carries at the front wall only a small protruding nipple 31 through which air can be blown into the initial workpiece 18 to shape it in the blow mold. The cutting edges 28 are straight since only two blow mold sections 11 are proposed, so that the produced bottom portion has a diagonal compressed seam.

When blow mold sections are closed, the bottom pieces 24 rest on the nozzle mouth piece 2, namely on the inclined surface 22, which is inclined to axis 32. The extensions 25 abut each other at the cutting edges 28 and separate the ingot butt 33 from the tube workpiece located in the blow mold. The mandrel device 34, namely, the mandrel cone or nozzle cone 1, is backwardly and forwardly movable in accordance with arrow 5 in the axial direction and separates, in a forward-pushed position in accordance with FIG. 2, the ingot butt 33 from the material 4 located in the ring nozzle.

The cutting edges 28 are placed at a distance from the front section of the nozzle mouth piece 2 and lay in the area of the bottom piece which defines the outer surfaces of the bottom of the containers to be manufactured. The extension 25 of the bottom portions 24 which rest on the nozzle mouth piece 2, define a hollow space 35 which receives the ingot butt 33. This hollow space 35 bridges the discharge opening of the nozzle mouth piece. Into this hollow space 35 extends the front end portion of the mandrel device, which front end portion protrudes from the nozzle mouth piece, when the mandrel device, for the purpose of closing the annular slot 3, is pushed forward, according to FIG. 2.

The annular slot 3 is defined by an inner surface area 36 of the nozzle mouth piece 2 and by an outer surface 37 of the nozzle cone 1 of the mandrel device 34, and has a conical form, in which at least one of these surfaces 36, 37 runs at an angle to the axis 32. The diameter of the annular slot 3 reduces from an inlet ring channel 38 towards the front section of the ring nozzle. Also the cross-section of the annular slot is reduced when the annular slot is opened, according to FIG. 1, towards the front side of the ring nozzle, whereby the angle between surface 37 and axis 32 is smaller than the angle between surface 36 and axis 32. The inner surface 36 and the inclined surface 22 of the nozzle mouth piece 2 together form a sharp angle. When the annular slot is closed, the mandrel device 34 and the nozzle mouth piece 2 have contact with each other in the frontal area of the nozzle mouth piece 2. The separating of the ingot butt from the material located in the ring nozzle is thusly made at the front side of the ring nozzle and not inside the ring nozzle.

Figure 2:
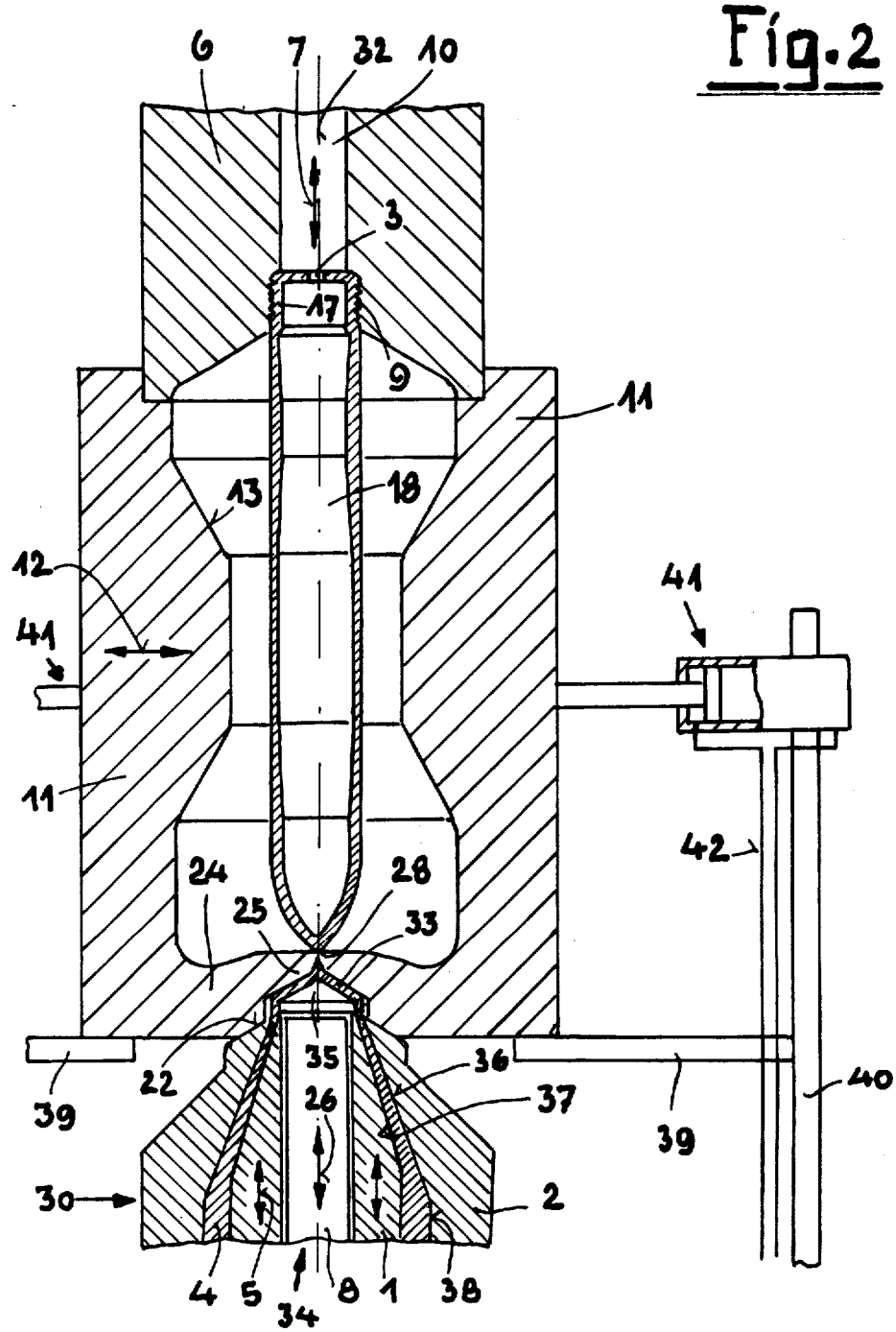
FIG. 2 illustrates the device according to FIG. 1 in a vertical cross-sectional view with a closed blow mold.

In accordance with FIG. 2, each blow mold section 11 is slidably arranged on a horizontal bar 39 which is mounted on a frame 40. The frame 40 supports also a blow-mold activating device 41, which comprises two dual-functioning piston-cylinder devices, each of which engages one of the blow mold sections. The piston-cylinder device of the blow mold activating device are supplied with pressure fluid, pressure gas or hydraulic fluid, via pipes 42.

According to FIG. 1, a platform 43 carries, in addition to the frame 40, a rod 44, on which an extension piece 45 of the discharge device 6 is glidably arranged. On the platform is also arranged an activating apparatus 46 which engages the extension 45 for the purpose of moving the discharge device 6. The activating apparatus 46 is also in the form of a piston-cylinder device, which is supplied with pressure fluid via pipes 42.

The platform 43 supports furthermore a setting mechanism 47 which comprises two piston-cylinder devices and which engages the nozzle cone 1, and a mandrel-activating device 48 which is in the form of a piston-cylinder device and which engages the mandrel 8. Also these piston-cylinder devices are each supplied with pressure fluid via pipes 42. The pipes 42 terminate each in a valve system 49, 50, 51, 52, 53 which not only turns on and off the flow of pressure fluid but also the quantity per time unit of the flow of pressure fluid can be set or adjusted. The valve devices are each connected to main pipes 54, over which the pressure fluid is supplied to the apparatus.

What is claimed is:

1. Apparatus for manufacturing a blown hollow body of a synthetic material, the hollow body having a head piece and a closed bottom portion, the apparatus having a longitudinal axis, said apparatus comprising:

a discharge receiver device movable along said axis from a lowered position to a raised position having a recess forming the head piece, said recess being aligned along said axis;

a blow needle having a nipple on one end thereof, said needle being concentrically housed in said discharge receiver device along said axis with said nipple extending into said recess;

a multi-sectional blow form concentrically aligned along said axis, said blow form comprising a plurality of sections movable from an open position to a closed position, said blow form abutting said discharge receiver device in said raised position in its closed position thus defining a closed mold volume, each section having a bottom piece with a bottom surface, each said bottom piece extending transversely to said axis and having a cutting edge;

a ring nozzle extrusion means concentrically aligned along said axis for extruding a synthetic material comprising a nozzle cone and a nozzle mouthpiece concentrically surrounding said nozzle cone forming a ring-slotted jet orifice from which the synthetic material can be extruded, said orifice terminating in a frontal area of said nozzle mouthpiece, the cross-sectional area of said jet orifice taken on a plane perpendicular to said axis reducing towards said frontal area of said nozzle mouthpiece;

means for abutting said discharge receiver device against said extrusion means in said lowered position and for moving said discharge receiver along said axis from said lowered position to said raised position with respect to said extrusion means so that a parison is formed therebetween;

means for moving said multi-sectional blow form from said open to said closed position so that a surface of said frontal area inclined with respect to said axis annularly abuts corresponding inclines on said bottom surfaces of said blow form sections whereby said blow form is wedged between said extrusion means and said discharge receiver device in said raised position and defining an ingot butt forming hollow space which bridges said jet orifice, said bottom pieces in said closed position meeting to form said closed mold volume; and means for moving said nozzle cone with respect to said nozzle mouthpiece upon closing of said blow form sections such that said nozzle cone and nozzle mouthpiece come into contact with each other only at the frontal area of said nozzle mouthpiece, a frontal end portion of said nozzle cone extending into said hollow space;

said hollow space being only large enough in a direction parallel to said axis such that said frontal end portion of said nozzle cone does not contact said bottom surfaces of said bottom pieces of said blow form sections.

2. Apparatus for manufacturing a blown hollow body of a synthetic material, the hollow body having a head piece and a closed bottom portion, the apparatus having a longitudinal axis, said apparatus comprising:

a discharge receiver device movable along said axis from a lowered position to a raised position having a recess forming the head piece, said recess being aligned along said axis;

a blow needle having a nipple on one end thereof, said needle being concentrically housed in said discharge receiver along said axis with said nipple extending into said recess, said nipple being sized smaller than said recess;

a multi-sectional blow form concentrically aligned along said axis, said blow form comprising a plurality of sections movable from an open position to a closed position, said blow form abutting said discharge receiver device in said raised position in its closed position thus defining a closed mold volume, each section having a bottom piece with a bottom surface, each said bottom piece extending transversely to said axis and having a cutting edge, said bottom pieces meeting to form said closed mold volume;

a ring nozzle extrusion means concentrically aligned along said axis for extruding a synthetic material comprising a nozzle cone having coaxially defined therein a cylindrical opening and a nozzle mouthpiece concentrically surrounding said nozzle cone forming a ring-slotted jet orifice from which the synthetic material can be extruded, said orifice terminating in a frontal area of said nozzle mouthpiece, said frontal area annularly abutting said bottom surfaces of said bottom pieces in said closed position thus defining a hollow space which bridges said orifice;

means for abutting said discharge receiver device against said extrusion means in said lowered position and for moving said discharge receiver device along said axis from said lowered position to said raised position with respect to said extrusion means so that a parison is formed therebetween;

means for moving said multi-sectional blow form from said open to said closed position;

a mandrel being coaxially housed in said cylindrical opening movable between an extended position and a retracted position, said mandrel having end portion means for forming said head piece in conjunction with said recess, said mandrel being positioned so that said end portion means is not within said hollow space in said retracted position, said end portion means being sized larger than said nipple and smaller than said recess;

means for moving said mandrel within said cylindrical opening between said extended and retracted positions.

* * * * *